United States Patent [19]

Gardner-Chavis et al.

[11] Patent Number: 5,078,982
[45] Date of Patent: Jan. 7, 1992

[54] REDUCTION OF NITROGEN OXIDE IN EFFLUENT GASES USING FORMALDEHYDE

[75] Inventors: Ralph A. Gardner-Chavis, Cleveland; Micahel P. May, Canton, both of Ohio

[73] Assignee: Molecular Technology Corporation, Canton, Ohio

[21] Appl. No.: 585,592

[22] Filed: Sep. 20, 1990

[51] Int. Cl.$^5$ .................. B01J 8/00; C01B 17/00; B01D 47/00
[52] U.S. Cl. .................. 423/239; 423/212; 423/235
[58] Field of Search .............. 423/239, 239 A, 235, 423/235 D, 212

[56] References Cited

U.S. PATENT DOCUMENTS

| | | | |
|---|---|---|---|
| 3,746,498 | 7/1973 | Stengel | 431/4 |
| 3,867,507 | 2/1975 | Myerson | 423/212 |
| 3,900,554 | 8/1975 | Lyon | 423/235 |
| 4,199,554 | 4/1980 | Araki et al. | 423/239 |
| 4,208,386 | 6/1980 | Arand et al. | 423/235 |
| 4,221,768 | 9/1980 | Inoue et al. | 423/239 |
| 4,325,924 | 4/1982 | Arand et al. | 423/235 |
| 4,335,084 | 6/1982 | Brogan | 423/235 |
| 4,350,769 | 9/1982 | Izumi | 423/235 |
| 4,585,632 | 4/1986 | Schneider et al. | 423/299 |
| 4,719,092 | 1/1988 | Bowers | 423/235 |
| 4,731,231 | 3/1988 | Perry | 423/235 |
| 4,743,436 | 5/1988 | Lyon | 423/235 |
| 4,800,068 | 1/1989 | Perry | 422/173 |
| 4,849,192 | 7/1989 | Lyon | 423/235 |
| 4,851,201 | 7/1989 | Heap et al. | 423/235 |
| 4,861,567 | 8/1989 | Heap et al. | 423/235 |

FOREIGN PATENT DOCUMENTS

| | | | |
|---|---|---|---|
| 654427 | 12/1962 | Canada | 423/235 |
| 2719417 | 2/1978 | Fed. Rep. of Germany | |
| 52-14619 | 2/1977 | Japan | |
| 52-42461 | 4/1977 | Japan | |
| 53-76968 | 7/1978 | Japan | |
| 53-128023 | 11/1978 | Japan | |
| 54-38268 | 3/1979 | Japan | |
| 54-46172 | 4/1979 | Japan | 423/235 |
| 1572118 | 7/1980 | United Kingdom | |

OTHER PUBLICATIONS

T. Yano et al, "Behavior of Methanol and Formaldehyde in Burned Gas from Methanol Combustion, Effects of Nitric Oxide on Oxidation Reaction", Bulletin of the SME, vol. 26, No. 213, pp. 406–413, 3/83.
"Reducing $NO_x$ Emissions," Power, Sep. 1988, pp. S-1 to S-13.
R. A. Perry and D. L. Siebers, Nature, vol. 324, 18-25, pp. 657-658.

Primary Examiner—Gregory A. Heller
Attorney, Agent, or Firm—Renner, Otto, Boisselle & Sklar

[57] ABSTRACT

A method is described for reducing the nitrogen oxide content of an effluent gas stream which comprises contacting the effluent gas with an amount of formaldehyde which is effective in reducing the nitrogen oxide content of the gas. In one preferred embodiment, the formaldehyde is contacted with the effluent stream in the presence of a catalyst which promotes the reaction between the formaldehyde and the nitrogen oxide contained in the gas stream. Preferred catalysts comprise zirconium, cerium, or mixtures thereof. Catalysts comprising zirconium in the plus four oxidation state, cerium in the plus four oxidation state, or mixtures thereof are particularly preferred catalysts.

25 Claims, 2 Drawing Sheets

REDUCTION OF NITROGEN OXIDE IN EFFLUENT GASES USING FORMALDEHYDE

FIELD OF THE INVENTION

The present invention relates to a method of reducing nitrogen oxide emissions and thereby reducing pollution of the atmosphere. More particularly, the present invention relates to the use of formaldehyde for reducing the nitrogen oxide content of combustion gases.

BACKGROUND OF THE INVENTION

There has been considerable effort devoted in recent years to solve various ecological and environmental problems such as air pollution, acid rain, etc. Combustion effluents and waste products from various sources are a major source of air pollution when discharged into the atmosphere. Unless the waste products are treated to remove deleterious components, the degradation of the environment will continue. Acid rain, forest and vegetation decline, changes in the ozone layer, harmful and irritating smog, etc., are examples of the results of the pollution of the atmosphere.

The common sources of pollution include internal combustion engines, industrial plants, utility boilers, gas turbines, and commercial establishments such as service stations, dry cleaners, etc. It has been estimated that power plants are responsible for about ⅓ of the annual $NO_x$ emissions while mobile sources such as automobiles and trucks are responsible for about 40% to about 50%. The types of air pollutants generated by such facilities include particulate emissions such as coal ash, sulphur compounds such as $SO_2$ and $SO_3$, carbon monoxide, ozone, and nitrogen oxides, commonly referred to collectively as "$NO_x$".

One of the common components found in polluted air is nitrogen dioxide ($NO_2$) which is known to be an extremely poisonous material. Nitrogen dioxide is introduced into the atmosphere from the various sources such as industrial plants producing nitric acid, but a major source of nitrogen dioxide is from nitric oxide (NO) formed by combustion processes of the types described above. The nitrogen oxide is formed during such combustion processes by (1) the reaction of nitrogen with atmospheric oxygen in the high temperature portion of the flame ("thermal fixation"); and (2) the oxidation of organic nitrogen compounds in the fuel on burning. The nitric oxide formed on combustion is converted to nitrogen dioxide on contact with air in the atmosphere.

Various procedures have been suggested to remove the oxides of nitrogen from waste gases so that the gases may be discharged into the atmosphere without harm to the environment. Nitrogen oxides emissions from boilers, gas turbines and internal combustion engines have been reduced by modifying the design of the engine or boiler to be more efficient or to operate at a lower temperature. Other proposals for reducing nitrogen oxide emissions involve use of various chemicals to reduce the nitrogen oxide content of effluent gases by converting the nitrogen oxides to innocuous gases. Such chemical processes, however, generally require extremely high temperatures such as in the range of about 1600° to about 2000° F. and higher. The temperatures of some of these chemical reactions for reducing nitrogen oxide content have been reduced by utilizing catalysts which are effective in promoting the reduction of nitrogen oxide, but using a catalyst has certain disadvantages such as the expense of the catalyst, the life of the catalyst, the expense and difficulty of contacting the combustion effluents with the catalyst, etc. Accordingly, there has been continued emphasis on procedures for reducing nitrogen oxide emissions which do not involve the direct use of catalysts. Various techniques for reducing $NO_x$ emissions from various combustion processes are described in the article entitled "Reducing $NO_x$ Emissions," Power September 1988, pp S-1 to S-13.

Among the chemicals which have been suggested as being useful in reducing the nitrogen oxide content of combustion effluents are nitrogen-containing compounds such as ammonia, urea, cyanuric acid, etc. For example, U.S. Pat. Nos. 3,900,554; 4,335,084; 4,743,436; 4,849,192; and 4,851,201 describe processes utilizing ammonia to reduce nitrogen oxide emissions.

The use of urea is described in U.S. Pat. Nos. 4,208,386; 4,325,924; 4,719,092; and 4,851,201. The use of cyanuric acid, and more specifically, the decomposition product of cyanuric acid, isocyanic acid, for reducing the nitrogen oxide content of combustion effluents is described in U.S. Pat. Nos. 4,731,231; 4,800,068; and 4,861,567; and by R. A. Perry and D. L. Siebers, Nature Vol. 324, 18/25, pp 657, 658. Perry proposes that isocyanic acid (HNCO) is formed from the decomposition of cyanuric acid when cyanuric acid is heated above about 330° C. When the isocyanic acid is mixed with the exhaust gas stream at temperatures 400° C. or higher, a series of reactions is proposed to occur that results in the loss of HCNO and NO.

U.S. Pat. Nos. 4,743,436 and 4,849,192 describe the process for treating effluent gases containing nitrogen oxides, sulfur trioxide, etc., wherein the effluent gas is first treated with ammonia to reduce the nitrogen oxide content and thereafter with methanol to reduce the sulfur trioxide content of the combustion effluent to $SO_2$ thereby minimizing the formation of ammonium bisulfate and sulfuric acid.

SUMMARY OF THE INVENTION

A method is described for reducing the nitrogen oxide content of an effluent gas stream which comprises contacting the effluent gas with an amount of formaldehyde which is effective in reducing the nitrogen oxide content of the gas. In one preferred embodiment, the formaldehyde is contacted with the effluent stream in the presence of a catalyst which promotes the reaction between the formaldehyde and the nitrogen oxide contained in the gas stream. Preferred catalysts comprise zirconium, cerium, or mixtures thereof. Catalysts comprising zirconium in the plus four oxidation state, cerium in the plus four oxidation state, or mixtures thereof are particularly preferred catalysts.

DESCRIPTION OF THE PREFERRED EMBODIMENTS

Figure 1:
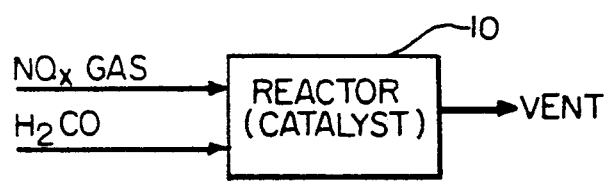
FIG. 1 is a diagram of an embodiment of the invention conducted under static conditions and wherein a catalyst is optional.

Throughout the specification and claims, the terms "nitrogen oxide(s)" and "$NO_x$" are used in the generic sense to include the various nitrogen oxide compounds such as nitrous oxide ($N_2O$), nitric oxide (NO) and nitrogen dioxide ($NO_2$).

In one embodiment, the present invention is a method for reducing the nitrogen oxide content of a gas which comprises contacting the gas with an amount of formaldehyde which is effective in reducing the nitrogen oxide content of the gas. The process may be a static, continuous or semi-continuous process. The invention is useful particularly for treating gas streams containing nitrogen oxides such as combustion gases resulting from the combustion of fossil fuels in internal combustion engines, hydrocarbon fueled power plants, coal-fired utility boilers and other similar installations.

In accordance with the process of the present invention, formaldehyde is brought into contact with the gas streams containing nitrogen oxides by introducing the formaldehyde into the exhaust pipes of various engines or into the flues and stacks of power plants, utility boilers and other similar installations. For convenience, the area in which the formaldehyde is mixed and reacted with the gas stream is referred to in this specification and claims as the "reaction zone". In order to be effective in reducing the nitrogen oxide content of the gas streams, the formaldehyde and the gas containing nitrogen oxides must be mixed at an elevated temperature such as above 700° F. In a particular embodiment, it has been discovered that formaldehyde can be utilized for reducing the nitrogen oxide content of a gas in the absence of catalysts at temperatures above 1000° F. and more often at temperatures between about 700°-2000° F. For example, it has been discovered that a stoichiometry of approximately 1 formaldehyde to 2 nitric oxide in the reaction zone at about 1200° F. is effective in eliminating approximately 80 to 90% of the nitric oxide in the gas stream. At lower temperatures, formaldehyde is still effective in reducing the nitric oxide content of the gases, but to a lesser degree and may require higher stoichiometries of formaldehyde to nitric oxide.

The amount of formaldehyde introduced into the reaction zone can be varied over a wide range, and preferred amounts will be determined from a consideration of the temperature and the amount of nitrogen oxide in the gas to be treated. Various mechanisms can be suggested to explain the effectiveness of formaldehyde in reducing the nitrous oxide content of gas streams. Although applicants have discovered the effectiveness of formaldehyde in reducing nitric oxide content of gas streams, analysis and evaluation of the mechanism of the reaction has not been completed, and applicants do not wish to be bound by any theory.

It is generally believed, however, that the formaldehyde reacts with nitric oxide in accordance with the following equation.

$$2NO + H_2CO = N_2 + CO_2 + H_2O$$

Thus, one mole of formaldehyde should be effective in reacting with and removing two moles of nitric oxide from the gas stream resulting in the formation of innocuous gases and water.

In one improved embodiment, catalysts can be utilized which promote the reaction of the nitric oxide with formaldehyde, and in the presence of the catalysts, the reaction can be conducted at lower temperatures which is extremely significant when the reaction is to be utilized in controlling pollution. In particular, when gas streams containing nitrogen oxide such as nitric oxide are brought into contact with formaldehyde in the presence of a catalyst for the reaction, the reaction can be conducted at temperatures of as low as 700° F., and with some catalyst combinations, the reaction is catalyzed to the point of about 100% nitric oxide elimination at about 1000° F. or greater.

Any catalyst which promotes the reaction of formaldehyde with nitric oxide can be utilized in the method of the present invention. Particular examples of catalysts which are useful include catalysts comprising zirconium, cerium, and mixtures of zirconium and cerium. In one preferred embodiment, at least some of the zirconium and cerium in the catalysts is present in the plus four oxidation state. Particularly improved results have been obtained utilizing a catalyst comprising both zirconium in the plus four oxidation state and cerium in the plus four oxidation state.

The oxides of zirconium and cerium are examples of compounds found to be useful as catalysts. Zirconium and cerium in the oxide forms are examples of compounds which contain zirconium and cerium in the plus four oxidation state. A particular example of a zirconium compound containing zirconium oxide in the plus four oxidation state is zirconium oxide, and a specific example of a cerium compound containing cerium in the plus four oxidation state is cerium oxide. Zirconium and cerium catalysts useful in the method of the present invention also are commercially available, and they often contain at least some zirconium or cerium in the plus four oxidation state along with other metals. The catalysts often contain other metals. For example, the catalysts useful in the method of the present invention may be commercially available mixed-metal oxide catalysts which contain at least some zirconium in the plus four oxidation state. An example of a commercial zirconium-containing catalyst useful in the present invention is the zirconia catalyst ZR-0304T1/8 available from the Engelhard Corporation.

The catalyst utilized in the method of the present invention may be formed in any conventional manner such as tableting, pelleting, etc., or the active catalyst material can be supported on a carrier. The carrier is generally inert and may include silica, alumina, clay, alumina-silica, silicon carbide, etc. The catalyst material can be deposited upon the carrier by techniques well known to those skilled in the art such as by depositing a solution containing the catalytic components on the carrier and thereafter drying and calcining the material. Utilizing these techniques, the catalytic components may be either coated on or impregnated in a carrier.

The mechanism by which the catalysts promotes the reaction of the formaldehyde with nitrogen oxide is not presently known with any certainty, and applicants do not wish to be bound by any theory. The significant fact for the purpose of the present invention is that introduction of formaldehyde into a gas stream containing nitric oxide at an elevated temperature in the presence of a catalyst results in the reduction of the nitric oxide content of the gas at a temperature which is lower than the temperature required in the absence of a catalyst.

The formaldehyde may be introduced into the reaction zone as a solution of the formaldehyde in water (e.g., 37% by weight solution in water), as formaldehyde which has been vaporized prior to addition to the reaction zone, or as a formaldehyde derivative compound which decomposes and generates formaldehyde upon heating. Examples of such formaldehyde derivatives include paraformaldehyde, trioxane, etc. Throughout this specification and claims, the term formaldehyde includes formaldehyde in various forms and derivatives which decompose to form formaldehyde.

In one embodiment of the present invention, the formaldehyde utilized in the method of the invention is derived from methanol. Formaldehyde can be readily produced from methyl alcohol and air (oxygen) by techniques well known to those skilled in the art. For example, methanol can be oxidized to formaldehyde in the presence of various catalysts such as iron-molybdena (FeMo) at temperatures of from about 550° F. to 650° F. As the formaldehyde is produced in the reaction, it can be stored or used immediately in the method of the invention by advancing the freshly prepared formaldehyde directly into the reaction zone (e.g., stack or flue).

The nitrogen oxide containing gas streams which can be treated in accordance with the method of the present invention may be derived from various mobile and stationary sources. Mobile sources include internal combustion engines such are used in automobiles, trucks and buses. Fixed or stationery sources of nitrogen oxide containing gases include stack gases from commercial and residential furnaces, kilns, residual oil and coal-fired utility boilers, industrial boilers, gas turbines, incinerators, diesel engine generators, etc.

Figure 2:
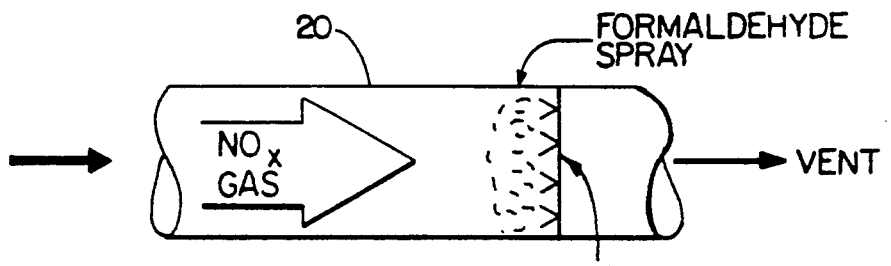
FIG. 2 is a flow diagram of one embodiment of the invention wherein a flue gas or exhaust gas containing $NO_x$ is treated with formaldehyde.
Figure 3:
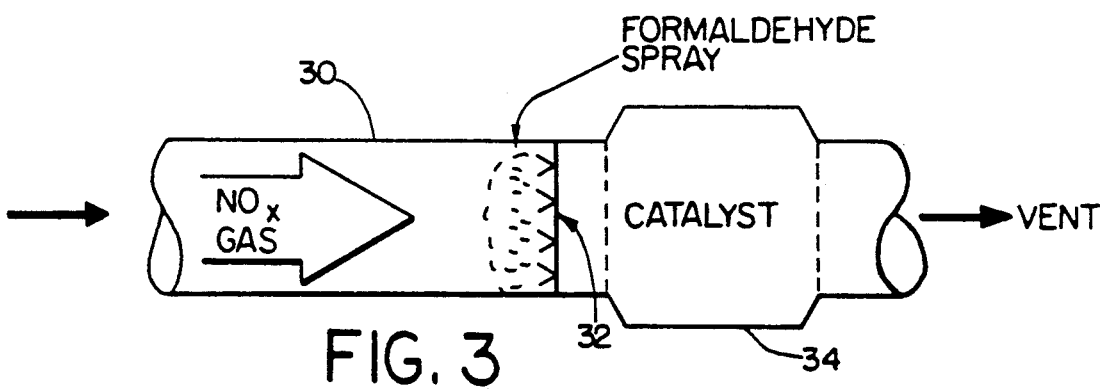
FIG. 3 is a flow diagram of another embodiment of the invention wherein a mixture of flue gas or exhaust gas containing $NO_x$ is contacted with formaldehyde and a catalyst to reduce the $NO_x$ content of the gas.

The process of the invention is illustrated by the embodiments shown in FIGS. 1-3. FIG. 1 illustrates the process of the invention conducted in static apparatus. Formaldehyde is charged to a reactor 10 which may or may not contain a catalyst. A gas containing nitrogen oxides ($NO_x$) is charged into reactor 10 which is heated to an elevated temperature to effect the reaction between the $NO_x$ and the formaldehyde. After the reaction has proceeded to the desired degree, the product gas is removed from reactor 10 and vented or recovered. In alternative embodiments of the static process, the order of introduction of the reactants into reactor 10 can be reversed, or the reactants can be fed simultaneously into the reactor either as separate feeds or as a mixture.

FIG. 2 illustrates a continuous process using flow tubes. A nitrogen oxide containing gas stream is passed through a tube 20 which serves as a reactor. The tube is equipped with a spraying system 22 and formaldehyde is sprayed into the $NO_x$ gas as it passes through the tube reactor 30. The $NO_x$ gas and/or the liquid formaldehyde may be heated before, during, or after mixing to provide a temperature sufficient to effect the reaction between the $NO_x$ and the formaldehyde. The reacted gas then exits the reactor and is vented to the atmosphere or to a collector if desired.

FIG. 3 illustrates one embodiment of a continuous process using flow tubes and a catalyst. The $NO_x$ gas stream is passed through tube 30 equipped with a spraying system 32. Formaldehyde is sprayed into and mixed with the $NO_x$ gas, and the mixture then passes over or through a catalyst in a reaction zone 34. The reaction is conducted at an elevated temperature by either preheating the mixture of $NO_x$ and formaldehyde, by heating the reaction zone 34 containing the catalyst. The gas exiting the reaction zone 34 is vented to the atmosphere or to a collector if desired.

The following examples illustrate the methods of the present invention. Unless otherwise indicated in the following examples and elsewhere in the specification and claims, all parts and percentages are by weight, all temperatures are in degrees Fahrenheit, and all pressures are at or near atmospheric pressure.

EXAMPLES 1-10 (FIG. 1)

These examples illustrate the selective non-catalytic reduction of NO with formaldehyde under static conditions.

In these examples, 0.151 gram of paraformaldehyde is charged to a 75 cc. stainless steel reactor and maintained in a helium atmosphere. Nitric oxide is charged to the reactor at 44 psig. The molar ratio of $NO:H_2CO$ is 2:1. The reactor is heated to the desired temperature, and then allowed to cool. The gaseous products of the reaction are recovered and analyzed. The temperature utilized and the results obtained are summarized in the following Table I.

TABLE I

| Selective Non-Catalytic Reduction of NO (Static) | | |
|---|---|---|
| Example | Temp. (°F.) | % NO Redn. |
| 1 | 182 | 3.4 |
| 2 | 223 | 25.9 |
| 3 | 349 | 21.6 |
| 4 | 687 | 26.4 |
| 5 | 749 | 48.3 |
| 6 | 1007 | 51.0 |
| 7 | 1140 | 67.4 |
| 8 | 1205 | 93.0 |
| 9 | 1205 | 47.9 |
| 10 | 1250 | 79.5 |

EXAMPLES 11-28

Nitric oxide gas is passed through a tube at the rate listed in Table II and mixed with formaldehyde at a molar ratio of $2NO:1H_2CO$. The mixture passes through the tube to a stainless steel reactor where the mixture is heated to the temperature listed in Table II. The gas exiting the reactor is passed through a condenser and a drier to remove water and a portion is collected and analyzed. The results of the analyses are also listed for these examples in Table II.

TABLE II

| Selective Non-Catalytic Reduction of NO (Flow Tube) | | | |
|---|---|---|---|
| Example | Flow Rate (cc/min) | Temp. (°F.) | % NO Redn. |
| 11 | 200 | 309 | 58.3 |
| 12 | 200 | 350 | 5.8 |
| 13 | 200 | 412 | 8.2 |
| 14 | 200 | 453 | 7.6 |
| 15 | 213 | 509 | 15.3 |
| 16 | 220 | 553 | 10.4 |
| 17 | 300 | 600 | 59.6 |
| 18 | 200 | 740 | 58.7 |
| 19 | 100 | 882 | 73.8 |
| 20 | 200 | 952 | 63.4 |
| 21 | 200 | 969 | 68.7 |
| 22 | 260 | 1030 | 63.2 |
| 23 | 200 | 1040 | 68.3 |
| 24 | 300 | 1080 | 86.1 |
| 25 | 200 | 1105 | 78.3 |
| 26 | 200 | 1140 | 74.2 |
| 27 | 200 | 1230 | 86.1 |
| 28 | 200 | 1314 | 94.6 |

Figure 4:
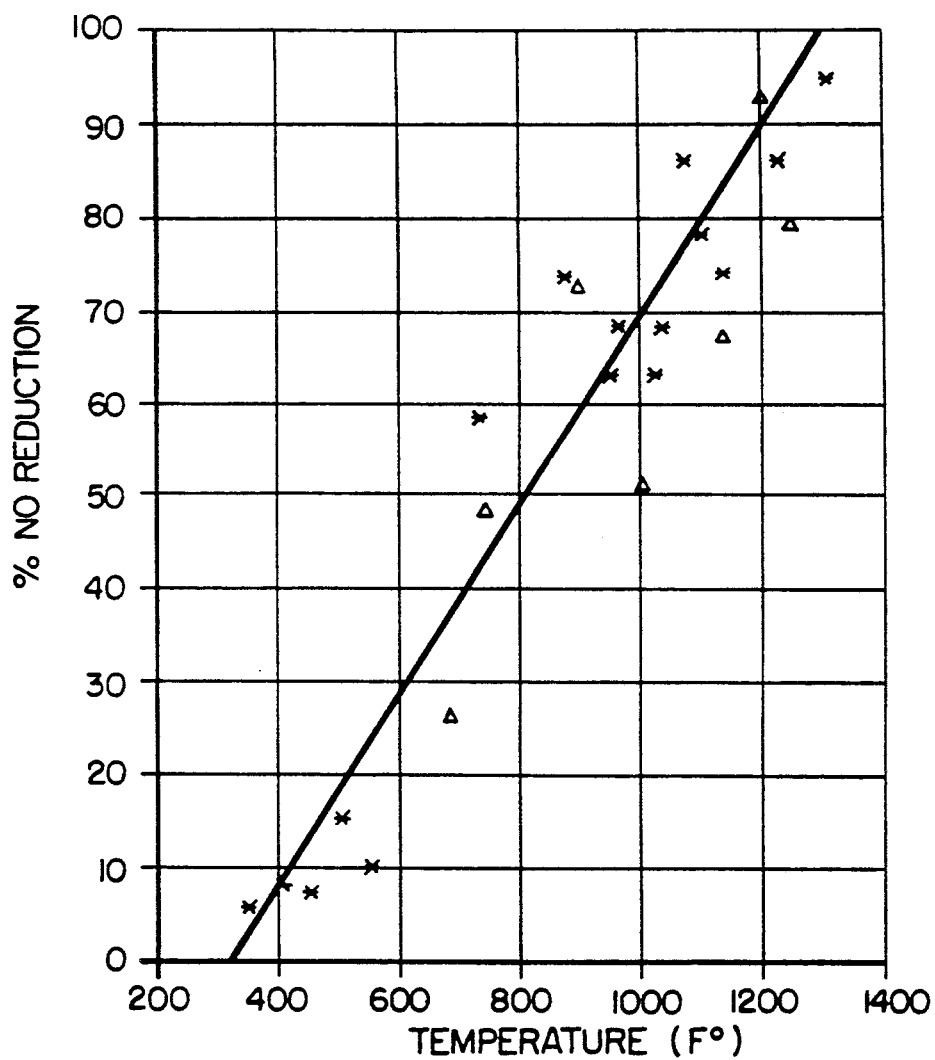
FIG. 4 is a graph of % NO reduction vs. temperature in selective non-catalytic reactions.

The relationship of temperature to % NO reduction based on the results reported in Tables I and II are presented in the graph of FIG. 4 wherein % NO reduction is plotted vs. temperature. The static reactor results are indicated by Δ and the flow tube reactor results are indicated by *. In both types of reactors, the % NO reduction increases with increasing temperature, and about 80-95% NO reduction is obtained at temperatures of about 1200° to 1300° F.

EXAMPLES 29-36

In these examples a mixture of NO and $H_2CO$ in a molar ratio of $2NO:1H_2CO$ is contacted with a 2 grams of catalyst at an elevated temperature (about 500° to 1000° F.) under static conditions as identified in Table III. The $ZrO_2/CeO_2$ catalyst mixture contains equal amounts of the two oxides. The product gas is recovered and analyzed. The results also are shown in Table III.

TABLE III

Selective Catalytic Reduction of NO (Static)

| Example | Catalyst | Temp. (°F.) | % NO Redn. |
|---|---|---|---|
| 29 | $ZrO_2$ | 511 | 29 |
| 30 | $ZrO_2$ | 707 | 20.3 |
| 31 | $CeO_2$ | 1008 | 72.9 |
| 32 | $ZrO_2/CeO_2$ | 754 | 66.2 |
| 33 | $ZrO_2/CeO_2$ | 900 | 73.2 |
| 34 | $ZrO_2/CeO_2$ | 904 | 85.1 |
| 35 | $ZrO_2/CeO_2$ | 1009 | 61.2 |
| 36 | $ZrO_2/CeO_2$ | 1008 | 100 |

EXAMPLE 37

Methanol is oxidized to formaldehyde with a iron/molybdenum catalyst at a temperature of about 550°-650° F. with an $O_2:CH_3OH$ molar ratio of 1:2. The formaldehyde is then contacted with an NO-containing gas at a temperature of 1205° F. under static conditions. The molar ratio of $NO:CH_3OH$ is 2:1. Analysis of the product gas indicates a % NO reduction of 93.6. A repeat of this experiment except that a $3O_2:4CH_3OH$ molar ratio is used results in a % NO reduction of 68.8.

While the invention has been explained in relation to its preferred embodiments, it is to be understood that various modifications thereof will become apparent to those skilled in the art upon reading this specification. Therefore, it is to be understood that the invention disclosed herein is intended to cover such modifications as fall within the scope of the appended claims.

We claim:

1. A method for reducing the nitrogen oxide content of an effluent gas stream comprising contacting the gas stream with formaldehyde in the presence of a catalyst which promotes a reaction between the formaldehyde and nitrogen oxide in the gas at a temperature of at least about 700° F.

2. The method of claim 1 conducted at a temperature from about 700° F. to about 2000° F.

3. The method of claim 1 conducted at a temperature from about 700° F. to about 1200° F.

4. The method of claim 1 wherein the catalyst comprises zirconium, cerium, or mixtures thereof.

5. The method of claim 1 wherein the catalyst comprises zirconium in the plus four oxidation state, cerium in the plus four oxidation state, or a mixture thereof.

6. The method of claim 1 wherein the catalyst comprises a mixture of zirconium in the plus four oxidation state and cerium in the plus four oxidation state.

7. The method of claim 1 wherein the formaldehyde is obtained from the oxidation of methanol.

8. The method of claim 3 wherein the catalyst comprises zirconium.

9. The method of claim 8 wherein at least some of the zirconium is in the plus four oxidation state.

10. The method of claim 3 wherein the catalyst comprises zirconium oxide.

11. The method of claim 3 wherein the catalyst comprises cerium.

12. The method of claim 11 wherein at least some of the cerium is in the plus four oxidation state.

13. The method of claim 3 wherein the catalyst comprises cerium oxide.

14. The method of claim 3 wherein the catalyst comprises zirconium and cerium.

15. The method of claim 3 wherein the catalyst comprises zirconium in the plus four oxidation state and cerium in the plus four oxidation state.

16. The method of claim 3 wherein the catalyst comprises zirconium oxide and cerium oxide.

17. The method of claim 3 wherein the gas stream contains at least some nitric oxide.

18. The method of claim 3 wherein the formaldehyde is produced from methanol.

19. A method of reducing the nitrogen oxide content of a combustion gas comprising the steps of
(A) converting methanol to formaldehyde;
(B) advancing the formaldehyde to a reaction zone containing a catalyst which promotes a reaction between formaldehyde and nitrogen oxides, said catalyst comprising zirconium in the plus four oxidation state, cerium in the plus four oxidation state, or mixtures thereof; and
(C) contacting the formaldehyde with the combustion gas in the presence of the catalyst in the reaction zone at a temperature of at least about 700° F. for a period of time sufficient to reduce the nitrogen oxide content of the combustion gas.

20. The method of claim 19 wherein the catalyst comprises a mixture of zirconium and cerium in the plus four oxidation state.

21. The method of claim 19 wherein the catalyst comprises zirconium oxide and cerium oxide.

22. The method of claim 19 wherein the combustion gas contains at least some nitric oxide.

23. The method of claim 19 wherein the contact in step (C) is at a temperature of from about 700° F. to about 1200° F.

24. The method of claim 19 wherein the combustion gas is an engine exhaust gas.

25. The method of claim 19 wherein the combustion gas is a smokestack, boiler exhaust gas, gas turbine exhaust, or diesel engine exhaust.

* * * * *